US008757306B2

(12) United States Patent
Kobayashi et al.

(10) Patent No.: US 8,757,306 B2
(45) Date of Patent: Jun. 24, 2014

(54) DRIVE SYSTEM FOR VEHICLE AND VEHICLE DRIVING METHOD

(75) Inventors: Tsunehiro Kobayashi, Saitama (JP); Mitsuhiro Iwadare, Saitama (JP); Satoshi Kodo, Saitama (JP); Takuya Yamada, Saitama (JP); Fumiyasu Suga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 13/541,086

(22) Filed: Jul. 3, 2012

(65) Prior Publication Data
US 2013/0048395 A1 Feb. 28, 2013

(30) Foreign Application Priority Data

Aug. 31, 2011 (JP) ................. 2011-189283

(51) Int. Cl.
*B60W 10/06* (2006.01)
*B60W 10/08* (2006.01)

(52) U.S. Cl.
USPC ........ 180/65.265; 180/65.6; 60/716; 903/930

(58) Field of Classification Search
USPC ............... 180/65.265, 65.275, 65.28, 65.285, 180/65.31, 65.6; 903/930, 946, 947; 60/706, 709, 716, 718
See application file for complete search history.

(56) References Cited

U.S. PATENT DOCUMENTS 4,305,254 A * 12/1981 Kawakatsu et al. ............. 60/716
7,597,164 B2 * 10/2009 Severinsky et al. ........ 180/65.27

FOREIGN PATENT DOCUMENTS

| JP | 08-042644 A | 2/1996 |
|---|---|---|
| JP | 2004-263566 A | 9/2004 |
| JP | 2005-502543 A | 1/2005 |
| JP | 2006-226150 A | 8/2006 |
| JP | 2010-018212 A | 1/2010 |

OTHER PUBLICATIONS

Mechanical translation of JP-2006-226150.*
Mechanical translation of JP2010-018212.*

* cited by examiner

*Primary Examiner* — John Walters
(74) *Attorney, Agent, or Firm* — Arent Fox LLP

(57) ABSTRACT

There is provided a drive system for a vehicle. The system includes: an internal combustion engine (ENG); a transmission mechanism (TM) a one-way clutch (OWC); a rotated driving member (11); an electric motor (MG1) that rotates the output shaft of the internal combustion engine; an electric motor generator (MG2) that transmits the rotational power to the rotated driving member and performs regenerative operation by receiving the rotational power output from the rotated driving member; and a controller (50) configured to cut off a fuel supply to the internal combustion engine and control the electric motor to rotate the output shaft of the internal combustion engine while the electric motor generator performs the regenerative operation.

10 Claims, 14 Drawing Sheets

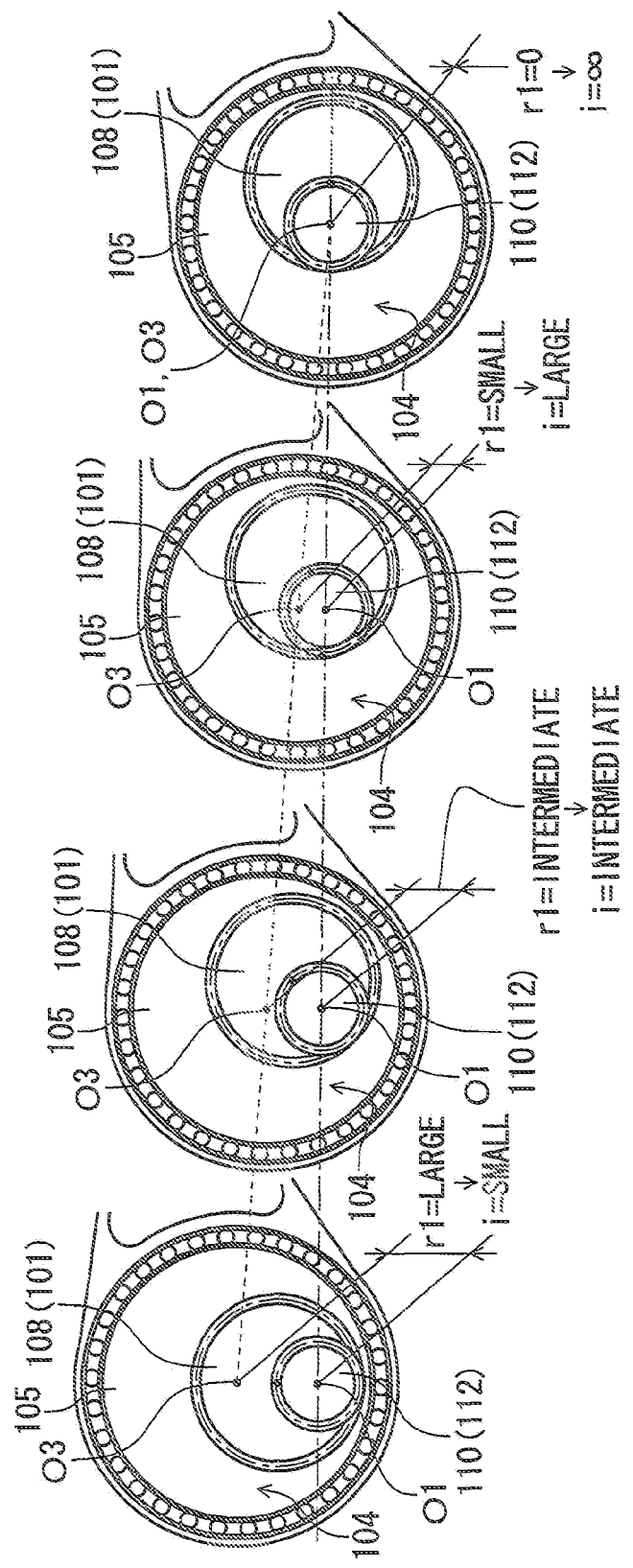

PRIOR ART

PRIOR ART

DRIVE SYSTEM FOR VEHICLE AND VEHICLE DRIVING METHOD

This application claims priority from Japanese Patent Applications No. 2011-189283, filed on Aug. 31, 2011, the entire contents of which are herein incorporated by reference.

BACKGROUND

1. Technical Field

Embodiments described herein relate to a hybrid drive system for a vehicle having an internal combustion engine (engine) and an electric motor generator (motor generator) as a drive source for driving.

2. Related Art

As this type of drive system for a vehicle in the related art, as disclosed in JP-T-2005-502543, a hybrid drive system for a vehicle in which an engine, a transmission, and a motor generator are combined is known. FIG. 13 is an outline diagram illustrating the drive system disclosed in JP-T-2005-502543, and FIG. 14 is a block diagram schematically illustrating a configuration thereof.

As illustrated in FIGS. 13 and 14, in this drive system, an input shaft of a transmission TM is connected to an output shaft of an engine ENG, and a differential case of a differential device DIFF leading to drive wheels 2 is connected to an output shaft of the transmission TM through a one-way clutch OWC. The one-way clutch OWC is incorporated into the transmission mechanism as an element thereof because the transmission mechanism TM is configured by an eccentric drive device. In addition, the motor generator MG is connected to the input shaft (output shaft of the engine ENG) of the transmission TM through a first clutch CL1 and is connected to the differential case of the differential device DIFF through a second clutch CL2 and a gear set GEAR.

In this drive system, engine driving only using the driving force of the engine ENG, EV driving only using the driving force of the motor generator MG, and parallel driving using both of the driving force of the engine ENG and the driving force of the motor generator MG can be performed. In addition, by using the regenerative operation of the motor generator MG, regenerative energy can be obtained during deceleration and regenerative braking can work for the drive wheels 2 at the same time. In addition, the motor generator MG can start the engine ENG However, similar to the above-described drive system, in the case of a system having the one-way clutch OWC on a power transmission pathway which transmits the rotational power of the engine ENG to the drive wheel 2 side, when the rotating speed on the downstream side of the one-way clutch OWC is higher than that on the upstream side thereof, the one-way clutch OWC blocks the power transmission. As a result, the power is not transmitted from the drive wheel 2 side to the engine ENG side. Therefore, when the rotating speed on the downstream side of the one-way clutch OWC becomes higher than that on the upstream side by, for example, releasing (disengaging) an accelerator pedal, the first clutch CL1 is disengaged and the second clutch CL2 is engaged. Accordingly, driving in which the motor generator MG regenerates the power on the drive wheel 2 side and regenerative braking works for the drive wheel 2 side at the same time can be selected.

In addition, during this time, in a range not causing the one-way clutch OWC to be in a connected state, the engine ENG can be maintained in an idle state or in an idle stop state. In the case where the engine ENG is maintained in the idle state, when the drive system is switched to engine driving thereafter, the rotating speed of the engine can be increased up to a required rotating speed immediately. Therefore, the response can be improved. In addition, in the case where the engine is set to the idle stop state, fuel consumption can be suppressed correspondingly. When the engine starts in the idle stop state, it is necessary that the motor generator MG crank the engine ENG by engaging the first clutch CL1 and disengaging the second clutch CL2.

As described above, when the engine ENG waits in the idle state, the drive system can be switched to engine driving with a good response, but there is a problem with fuel consumption for idling. On the other hand, when the engine ENG waits in the idle stop state, fuel consumption can be suppressed as compared to the case of waiting in the idle state, but it is necessary that the motor generator MG start the engine ENG by engaging the first clutch CL1 and disengaging the second clutch CL2 and that the rotating speed of the engine be increased up to a rotating speed capable of transmitting torque. During that time, unnecessary time is taken and thus there is a problem that the above operation cannot be performed with a good response.

SUMMARY OF THE INVENTION

One or more illustrative aspects of the present invention are to provide a drive system for a vehicle which can improve both of fuel consumption and response at the time of restarting an internal combustion engine.

In order to achieve the above-described object, according to a first aspect of the invention, there is provided a drive system for a vehicle (for example, a drive system for vehicle 1 according to an embodiment which will be described below). The system comprises: an internal combustion engine (for example, an engine ENG according to the embodiment which will be described below) that generates a rotational power with a fuel supply; a transmission mechanism (for example, a transmission TM according to the embodiment which will be described below) that changes a speed of the rotational power; a one-way clutch (for example, a one-way clutch OWC according to the embodiment which will be described below) comprising: an input member (for example, an input member 122 according to the embodiment which will be described below); an output member (for example, an output member 121 according to the embodiment which will be described below); and a locking member (for example, a roller 123 according to the embodiment which will be described below) configured to allow the input member and the output member to be locked or unlocked with each other, the locking member being configured to transmit the rotational power provided to the input member to the output member when the input member and the output member are locked with each other, wherein the input member and the output member are locked with each other when a forward rotating speed of the input member which receives the rotational power output from the transmission mechanism exceeds a forward rotating speed of the output member; a rotated driving member (for example, a rotated driving member 11 according to the embodiment which will be described below) that is connected to the output member of the one-way clutch and transmits the rotational power transmitted to the output member to a drive wheel (for example, drive wheels 2 according to the embodiment which will be described below); an electric motor (for example, a first motor generator MG1 according to the embodiment which will be described below) that is connected to an output shaft of the internal combustion engine so as to rotate the output shaft of the internal combustion engine; an electric motor generator (for example, a second motor generator MG2 according to the embodiment which will be described below) that is connected to the rotated driving member and configured to transmit the rotational power to the rotated driving member and configured to perform regenerative operation by receiving the rotational power output from the rotated driving member; and a controller (for example, vehicle controller 50 according to the embodiment which will be described below) that cuts off a fuel supply to the internal combustion engine and controls the electric motor to rotate the output shaft of the internal combustion engine while the electric motor generator performs the regenerative operation.

According to a second aspect of the invention, the controller supplies electric power generated by the electric motor generator performing the regenerative operation to the electric motor as electric drive power.

According to a Third aspect of the invention, the controller idles the internal combustion engine for an initial time, and then cuts off the fuel supply to the internal combustion engine and controls the electric motor to rotate the output shaft of the internal combustion engine while the electric motor generator performs the regenerative operation.

According to a fourth aspect of the invention, the controller is configured to stop rotating the output shaft of the internal combustion engine after a certain time has passed.

According to a fifth aspect of the invention, the system further comprises: a detector configured to detect a response-emphasized mode (for example, sport mode detector 54 according to the embodiment which will be described below), wherein the controller is configured to idle the internal combustion engine prior to rotating the output shaft of the internal combustion engine, after the detector detects the response-emphasized mode.

According to a sixth aspect of the invention, the transmission mechanism is a continuously variable transmission mechanism (for example, an infinitely and continuously variable transmission mechanism BD according to the embodiment which will be described below), and the controller is configured to change a gear ratio of the transmission mechanism in response to a rotating speed of the rotated driving member such that the rotating speed of the input member is smaller than the rotating speed of the output member.

According to a seventh aspect of the invention, there is provided a vehicle driving method for driving a vehicle comprising: an internal combustion engine that generates a rotational power with a fuel supply; a transmission mechanism that changes a speed of the rotational power; a one-way clutch comprising: an input member; an output member; and a locking member configured to allow the input member and the output member to be locked or unlocked with each other, the locking member being configured to transmit the rotational power provided to the input member to the output member when the input member and the output member are locked with each other, wherein the input member and the output member are locked with each other when a forward rotating speed of the input member, which receives the rotational power output from the transmission mechanism, exceeds a forward rotating speed of the output member; a rotated driving member that is connected to the output member of the one-way clutch and transmits the rotational power transmitted to the output member to a drive wheel; an electric motor that is connected to an output shaft of the internal combustion engine so as to rotate the output shaft of the internal combustion engine; and an electric motor generator that is connected to the rotated driving member and configured to transmit the rotational power to the rotated driving member and configured to perform regenerative operation by receiving the rotational power output from the rotated driving member. The method comprises: cutting off a fuel supply to the internal combustion engine and rotating the output shaft of the internal combustion engine while performing the regenerative operation.

According to an eighth aspect of the invention, the method further comprises: supplying electric power generated by the electric motor generator to the electric motor as electric drive power.

According to a ninth aspect of the invention, the method further comprises: while performing the regenerative operation, idling the internal combustion engine for an initial period of time; cutting off the fuel supply to the internal combustion engine; and controlling the electric motor to rotate the output shaft of the internal combustion engine.

According to a tenth aspect of the invention, the method further comprises stopping rotating the output shaft of the internal combustion engine after a certain time has passed.

According to an eleventh aspect of the invention, the method further comprises detecting a response-emphasized mode; and idling the internal combustion engine prior to rotating the output shaft of the internal combustion engine, after detecting the response-emphasized mode.

According to an twelfth aspect of the invention, the transmission mechanism is a continuously variable transmission mechanism, and the method further comprises changing a gear ratio of the transmission mechanism in response to a rotating speed of the rotated driving member such that the rotating speed of the input member is smaller than the rotating speed of the output member.

According to the first aspect of the invention, when the accelerator is released, the rotation (motoring operation) of the output shaft of the internal combustion engine is performed by the driving force of the electric motor located upstream from the one-way clutch while the electric motor generator located downstream from the one-way clutch regenerates the power output from the drive wheel side. During that time, fuel cut is performed. During the time, the output shaft of the internal combustion engine is in the motoring state and performs preliminary rotation. Therefore, when the drive system is switched to a state of using the driving force of the internal combustion engine thereafter, the output rotating speed of the internal combustion engine is increased up to a predetermined required rotating speed with a good response simply by restarting fuel supply. In addition, during the motoring operation (when the electric motor rotates the output shaft of the internal combustion engine), it is not necessary to perform idling operation with a minimum fuel supply and thereby unnecessary fuel consumption can be suppressed. That is, according to this drive system, fuel consumption and response at the time of restarting the internal combustion engine can be improved at the same time. In addition, in a case where acceleration is selected by pressing the accelerator again during deceleration, when it is assumed that a time lag equal to or longer than a given time occurs until the internal combustion engine generates a required driving force, the response delay can be compensated by continuously giving the driving force of the electric motor to the output shaft of the internal combustion engine as it is and by giving the driving force of the electric motor generator to the rotated driving member.

According to the second aspect of the invention, a driving force of the electric motor required for performing the motoring operation of the internal combustion engine can be provided by energy regenerated from the electric motor generator. As a result, the energy efficiency can be improved.

According to the third aspect of the invention, an idle period (this period is referred to as "an idle period") is provided before a period in which the motoring operation is performed while fuel cut is performed (this period is referred to as "a motoring operation period"). Therefore, a case where the accelerator is pressed again (the accelerator pedal is engaged) during the idle period can exhibit a better response (can increase the output rotating speed of the internal combustion engine up to a required rotating speed with a better response), as compared to a case where the accelerator is pressed during the motoring operation period. Here, the motoring operation represents the output shaft of the internal combustion engine being rotated by the power of the electric motor, irrespective of fuel supply, and the idling operation represents fuel being supplied to rotate the engine with no load at a minimum rotating speed.

According to the fourth aspect of the invention, even when the motoring operation is performed, the motoring operation is stopped after a predetermined time. Therefore, the energy consumption can be suppressed. That is, for example, when a vehicle drives in a long downhill, there is a case where a long time is taken until the accelerator pedal is pressed down again. In this case, when the motoring operation is continued during such a long time, unnecessary electric energy is consumed. Therefore, after a predetermined time, the motoring operation is stopped in preference to the response. As a result, unnecessary energy consumption can be suppressed.

According to the fifth aspect of the invention, when the response-emphasized mode is selected, the idle period takes precedence over the motoring operation period. Therefore, when the accelerator is pressed again during the idle period, a good response can be exhibited.

According to the sixth aspect of the invention, a shock caused by the motoring operation can be prevented from being transmitted to the drive wheel side, which contributes to the improvement of product performance.

BRIEF DESCRIPTION OF THE DRAWINGS

FIGS. 5A to 5D are diagrams of the first-half processes illustrating a transmission principle of a variable gear ratio mechanism in the transmission mechanism, wherein FIG. 5A is a diagram illustrating a state where an eccentricity r1 with respect to an input central axis O1 as a rotation center of a first supporting point O3 which is a central point of an eccentric disk 104 is set to be "large" and a gear ratio i is set to be "small"; FIG. 5B is a diagram illustrating a state where the eccentricity r1 is set to be "intermediate" and the gear ratio i is set to be "intermediate"; FIG. 5C is a diagram illustrating a state where the eccentricity r1 is set to be "small" and the gear ratio i is set to be "large"; and FIG. 5D is a diagram illustrating a state where the eccentricity r1 is set to be "zero" and the gear ratio i is set to be "infinite ($\infty$)".

FIGS. 6A to 6C are diagrams of the second-half processes illustrating the transmission principle of the variable gear ratio mechanism in the transmission mechanism and are diagrams illustrating the change of an oscillating angle θ2 of an input member 122 of a one-way clutch 120 in a case where the eccentricity r1 of the eccentric disk and the gear ratio i are changed, wherein FIG. 6A is a diagram illustrating a state where the oscillating angle θ2 of the input member 122 is "large" due to setting the eccentricity r1 to be "large" and the gear ratio i to be "small"; FIG. 6B is a diagram illustrating a state where the oscillating angle θ2 of the input member 122 is "intermediate" due to setting the eccentricity r1 to be "intermediate" and the gear ratio i to be "intermediate"; and FIG. 6C is a diagram illustrating a state where the oscillating angle θ2 of the input member 122 is "small" due to setting the eccentricity r1 to be "small" and the gear ratio i to be "large";

DETAILED DESCRIPTION

Hereinafter, a drive system for a vehicle according to an embodiment of the present invention will be described with reference to the drawings.

Figure 1:
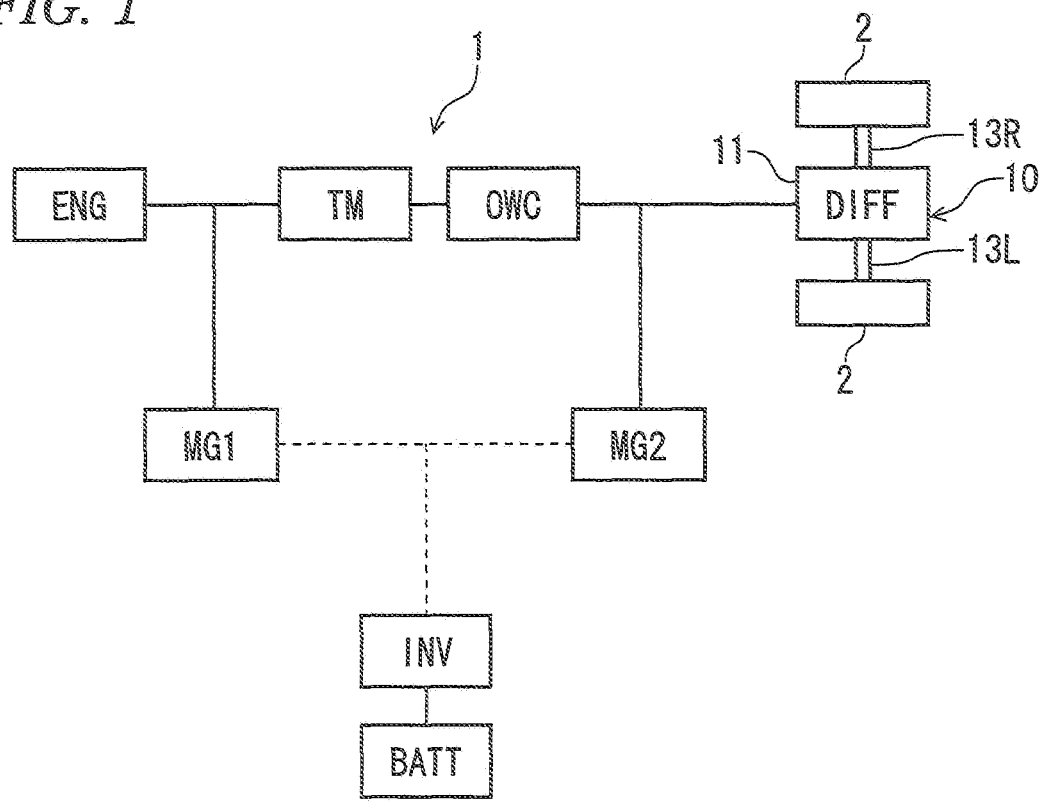
FIG. 1 is a block diagram schematically illustrating a configuration of a drive system for a vehicle according to an embodiment of the present invention.
Figure 2:
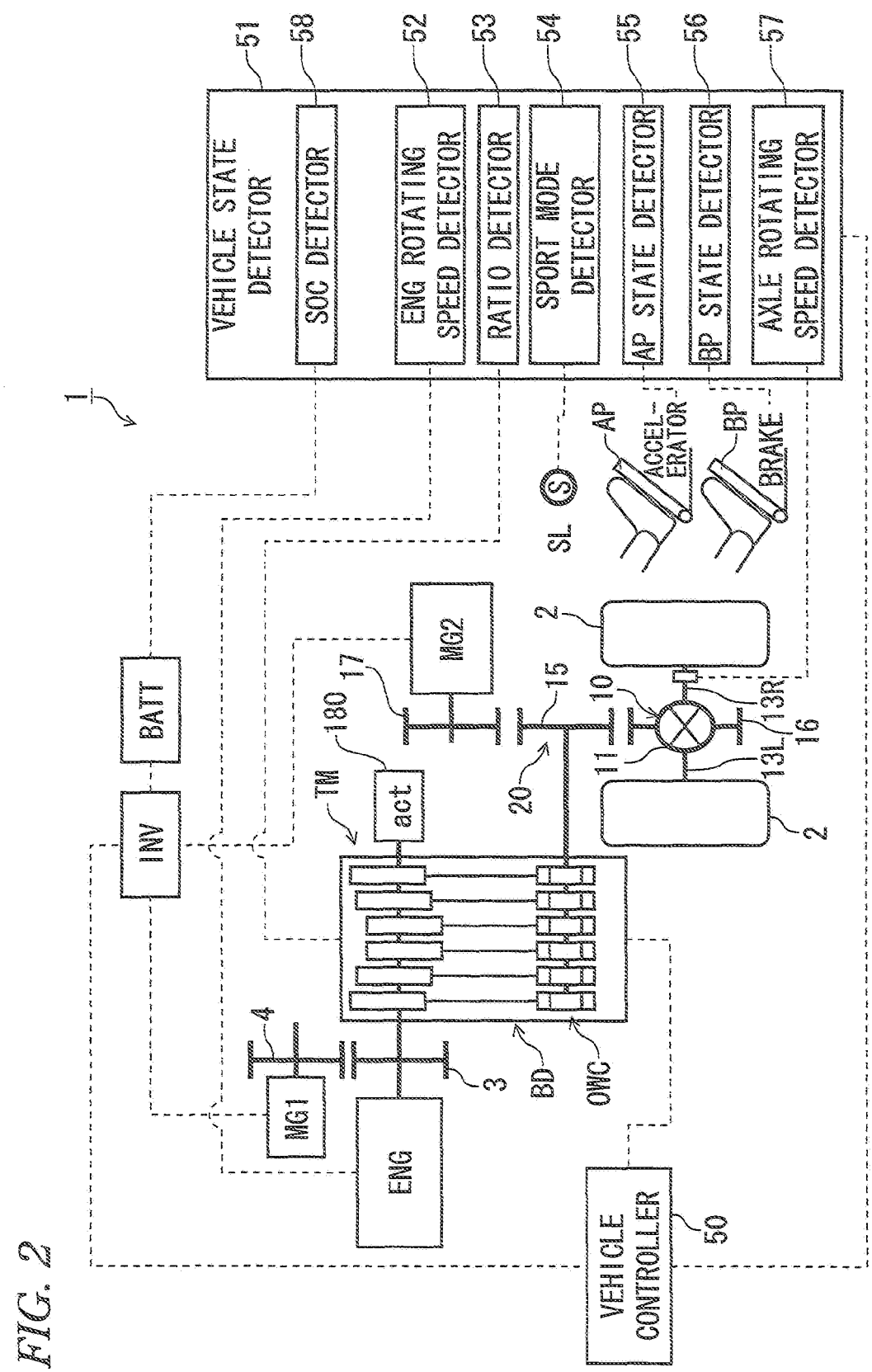
FIG. 2 is a distribution diagram illustrating the drive system.
Figure 3:
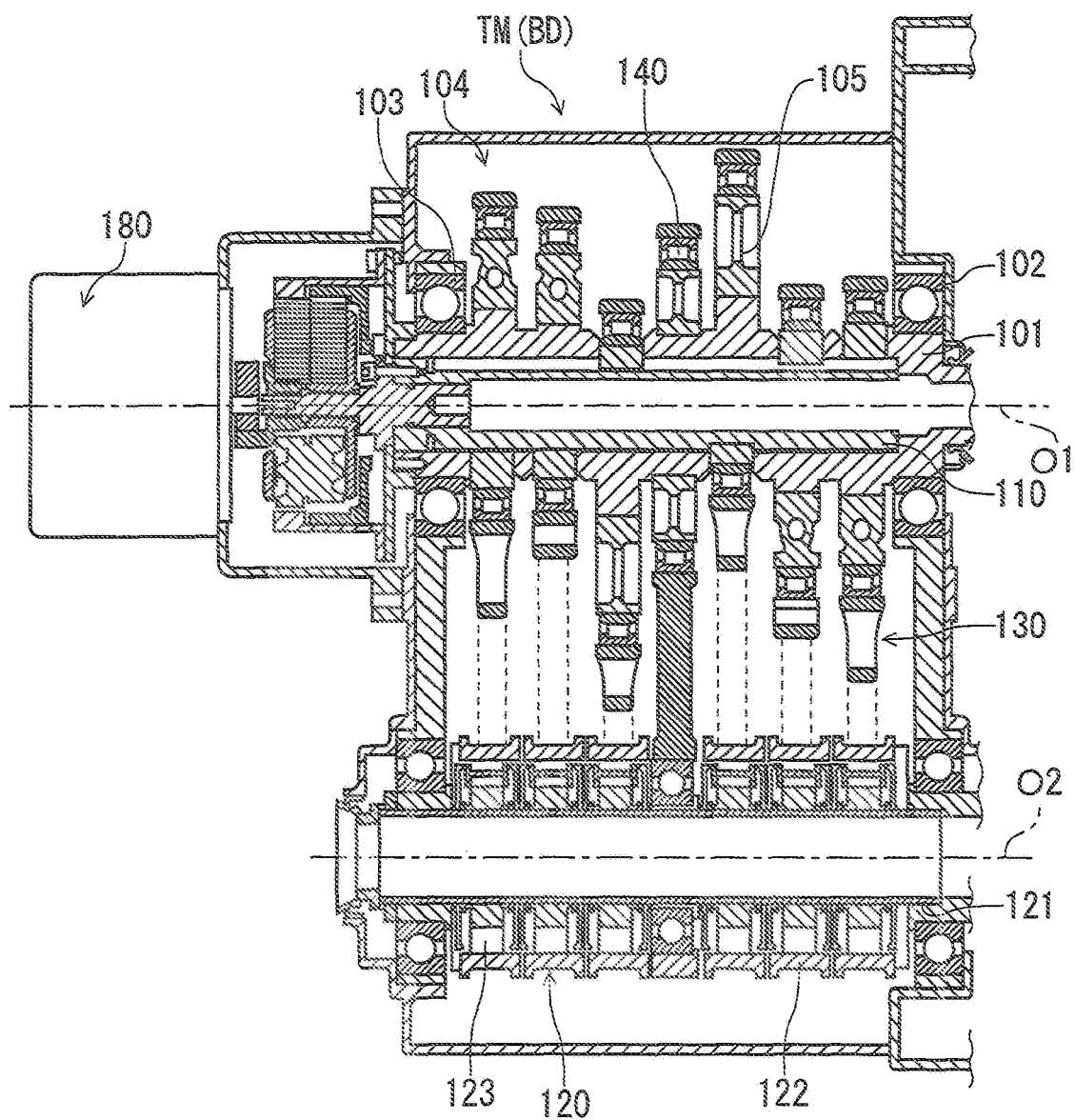
FIG. 3 is a cross-sectional view illustrating a specific configuration of an infinitely and continuously variable transmission mechanism of the drive system.
Figure 4:
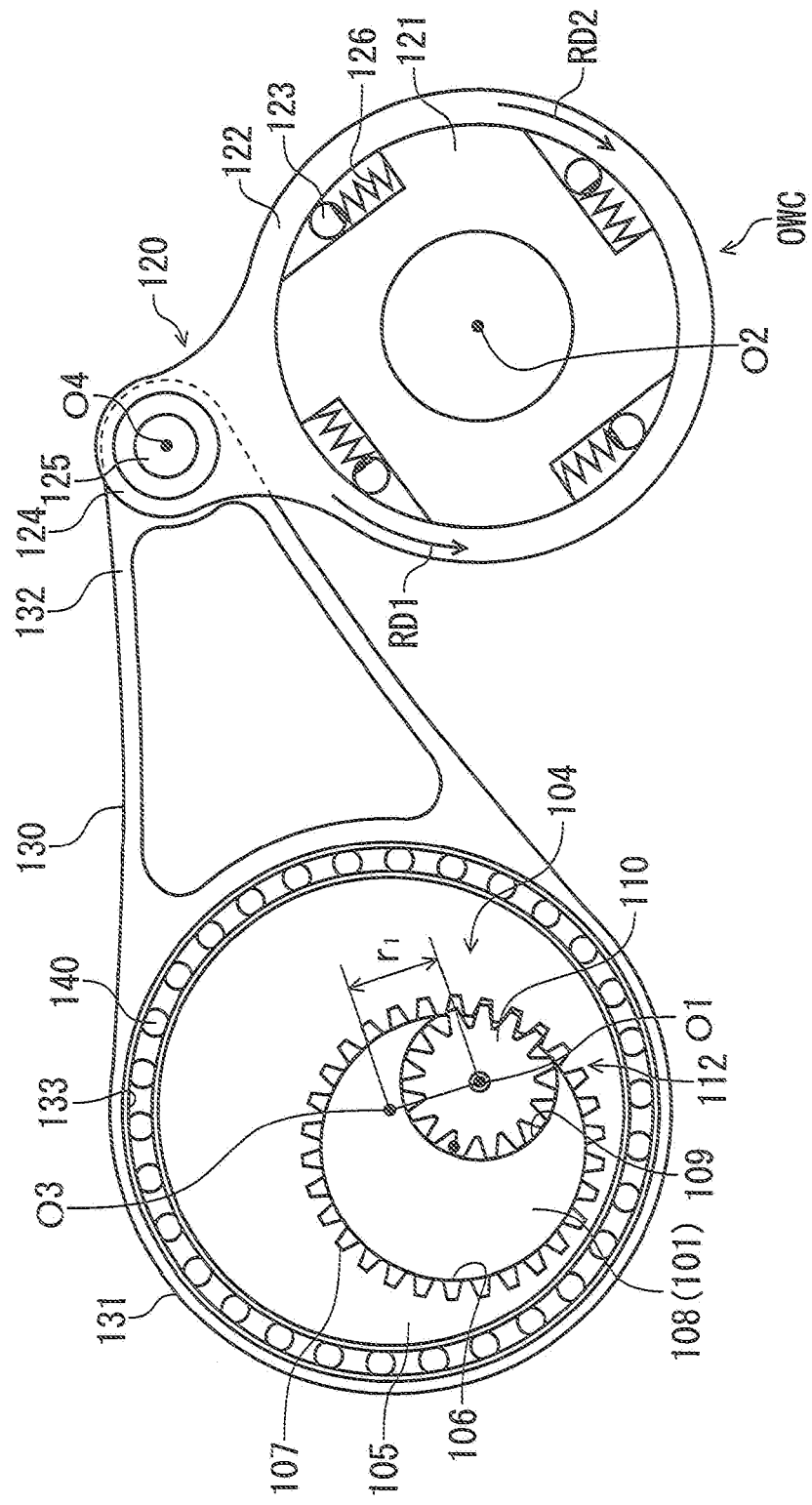
FIG. 4 is a cross-sectional view illustrating a partial configuration of the transmission mechanism when seen from the direction of an axis.

FIG. 1 is a block diagram schematically illustrating a configuration of the drive system for a vehicle according to the embodiment. FIG. 2 is a distribution diagram illustrating the same system. FIG. 3 is a cross-sectional view illustrating a specific configuration of an infinitely and continuously variable transmission mechanism of the same system. FIG. 4 is a cross-sectional view illustrating a partial configuration of the same infinitely and continuously variable transmission mechanism when seen from the direction of an axis.

<Overall Configuration>

As illustrated in FIGS. 1 and 2, this drive system for vehicle 1 includes an engine (internal combustion engine) ENG that generates rotational power with fuel supply; a transmission (continuously variable transmission mechanism) TM that is provided on the downstream side of the engine ENG and continuously changes a speed of the rotational power generated from the engine ENG for output; a first motor generator (electric motor) MG1 that is connected between the engine ENG and the transmission TM through gears 3 and 4 and can perform the motoring operation of an output shaft of the engine ENG; a one-way clutch OWC that is provided in a output portion of the transmission TM and transmits only the power from the engine ENG side to drive wheel 2 side; a rotated driving member 11 that transmits the output rotation transmitted through the one-way clutch OWC to the drive wheels 2; and a second motor generator (electric motor generator) MG2 that is connected to the rotated driving member 11 through a gear set 20 (gears 15, 16, 17).

In addition, the drive system for vehicle 1 includes a battery BATT which can exchange electric power through an inverter INV with the first motor generator MG1 and/or the second motor generator MG2, vehicle controller 50 which controls various elements to perform various controls of driving patterns and the like, and vehicle state detector 51 which give information required for the controls to the vehicle controller 50.

The vehicle state detector 51 includes ENG rotating speed detector 52 which detects a rotating speed NE of the engine ENG, ratio detector 53 which detects a gear ratio of the transmission TM, sport mode detector 54 which detects whether a shift range switching device SL has selected a sport mode (corresponding to a response-emphasized mode) or not, AP state detector 55 which detects a state of an accelerator pedal AP, BP state detector 56 which detects a state of a brake pedal BP, axle rotating speed detector 57 which detects a rotating speed of an axle of the drive wheels 2, and SOC detector 58 which detects a state of charge (SOC) of the battery BATT.

As illustrated in FIG. 4, the one-way clutch OWC includes an input member (clutch outer portion) 122, an output member (clutch inner portion) 121, plural rollers (locking member) 123 which are arranged between the input member 122 and the output member 121 and set both of the members 122 and 121 to be in a state of being locked with each other or in a state of being unlocked with each other, and biasing members 126 which bias the rollers 123 toward a direction setting the members to be in the locked state. When a forward (direction indicated by an arrow RD1) rotating speed of the input member 122 receiving the rotational power from the transmission TM exceeds a forward rotating speed of the output member 121, the rotational power input to the input member 122 is transmitted to the output member 121 by setting the input member 122 and the output member 121 to be in the state of being locked with each other.

The output member 121 of the one-way clutch OWC is connected to the rotated driving member 11 through the gears 15 and 16. The rotated driving member 11 is configured by a differential case of a differential device 10, and the rotational power transmitted to the output member 121 of the one-way clutch OWC is transmitted to the left and right drive wheels 2 through the differential device 10 and left and right axle shafts 13L and 13R. A differential pinion and side gears (not illustrated) are attached to the differential case (rotated driving member 11) of the differential device 10. The left and right axle shafts 13L and 13R are connected to the left and right side gears and rotate differentially.

As illustrated in FIG. 1, the second motor generator MG2 and the rotated driving member 11 are connected to each other so as to transmit the power by meshing the gear 17, which is attached to a rotor shaft of the second motor generator MG2, with the gear 16, which is provided in the rotated driving member 11 through the gear 15 provided in the output shaft (output member 121) of the one-way clutch OWC. For example, when the second motor generator MG2 functions as a motor, the driving force is transmitted from the second motor generator MG2 to the rotated driving member 11. In addition, when the second motor generator MG2 functions as a power generator, the power is input from the rotated driving member 11 to the second motor generator MG2 and the mechanical energy is converted to the electric energy. At the same time, a regenerative braking force generated from the second motor generator MG2 is applied to the rotated driving member 11. The power transmission between the second motor generator MG2 and the rotated driving member 11 may be performed by a planetary gear mechanism instead of the gear set including the gears 15 to 17.

In addition, a rotor shaft of the first motor generator MG1 is connected to an input shaft 101 of the transmission TM through gears 3 and 4 and also connected to the output shaft of the engine ENG through the gears 3 and 4, and transmits the power to each other between the output shaft of the engine ENG and the input shaft 101 of the transmission TM. Even in this case, when the first motor generator MG1 functions as a motor, the driving force is transmitted from the first motor generator MG1 to the input shaft 101 of the transmission TM and the output shaft of the engine ENG In addition, when the first motor generator MG1 functions as a power generator, the power is transmitted from the output shaft of the engine ENG to the first motor generator MG1.

In this drive system 1 having the above-described elements, the rotational power generated from the engine ENG and/or the first motor generator MG1 is input to the one-way clutch OWC through the transmission TM, is input to the rotated driving member 11 through the one-way clutch OWC, and is transmitted from the differential device 10 to the drive wheels 2. Alternatively, the rotational power generated from the second motor generator MG2 is input to the rotated driving member 11 and transmitted from the differential device 10 to the drive wheels 2.

<Configuration of Transmission>

Next, the transmission TM used in the drive system 1 will be described.

The transmission TM is configured by a continuously variable transmission. The continuously variable mechanism in this case is a type of NT (Infinitely Variable Transmission: a type of transmission mechanism in which an infinite number of gear ratios are provided so as to set the output rotating speed to be zero without using a clutch) and is configured by an infinitely and continuously variable mechanism BD which can continuously change a gear ratio (ratio=i) and set a maximum value of the gear ratio to be infinite (∞).

As illustrated in FIGS. 3 and 4, the infinitely and continuously variable transmission mechanism BD includes the input shaft 101 which rotates about the input central axis O1 by receiving the rotational power from the engine ENG, the plural eccentric disks 104 which integrally rotate with the input shaft 101, the same numbers of connecting members 130 as those of the eccentric disks 104 for connecting the input side and the output side to each other, and the one-way clutch 120 which is provided on the output side.

Each of the plural eccentric disks 104 forms a circular shape with the first supporting point O3 as a center. The first supporting points O3 are provided in the circumferential direction of the input shaft 101 at regular intervals. Each of them can change the eccentricity r1 with respect to the input central axis O1 and is set to rotate about the input central axis O1 along with the input shaft 101 while maintaining the eccentricity r1. Therefore, the plural eccentric disks 104 are provided so as to rotate eccentrically about the input central axis O1 along with the rotation of the input shaft 101 while maintaining the eccentricity r1.

As illustrated in FIG. 4, the eccentric disk 104 includes an outer circumferential disk 105 and an inner circumferential disk 108 which is integrally formed with the input shaft 101. The inner circumferential disk 108 is formed as a thick disk with a center deviated from the input central axis O1, which is the central axis of the input shaft 101, by a given eccentric distance. The outer circumferential disk 105 is formed as a thick disk with the first supporting point O3 as a center, and has a first circular hole 106 having a center at a position deviated from the center of the outer circumferential disk 105 (the first supporting point O3). The outer circumference of the inner circumferential disk 108 is fitted so as to rotate along the inner circumference of the first circular hole 106.

In addition, the inner circumferential disk 108 has a second circular hole 109 which has the input central axis O1 as a center and a part which in the circumferential direction has an opening toward the outer circumference of the inner circumferential disk 108. A pinion 110 is rotatably housed inside the second circular hole 109. Teeth of the pinion 110 mesh with an internal gear 107, which is formed in the inner circumference of the first circular hole 106 of the outer circumferential disk 105, through the opening in the outer circumference of the second circular hole 109. In this case, the ratio of the number of teeth of the pinion 110 to the number of teeth of the internal gear 107 is 1:2.

The pinion 110 is provided so as to rotate coaxially with the input central axis O1 which is the central axis of the input shaft 101. That is, the rotation center of the pinion 110 matches the input central axis O1 which is the central axis of the input shaft 101. As illustrated in FIG. 3, the pinion 110 is rotated in the inside of the second circular hole 109 by an actuator 180 which is configured by a DC motor and a speed reduction mechanism. In normal operation, the pinion 110 is rotated in synchronization with the rotation of the input shaft 101. By setting the rotating speed of the pinion 110 to exceed or fall below the rotating speed of the input shaft 101 on the basis of the synchronized rotating speed, the pinion 110 is rotated relative to the input shaft 101. For example, in a case where the pinion 110 and the output shaft of the actuator 180 are arranged so as to be connected to each other and there is a rotational difference between the rotation of the actuator 180 and the rotation of the input shaft 101, the above-described configuration can be realized by using a speed reduction mechanism (for example, planetary gear) in which the relative angle between the input shaft 101 and the pinion 110 is changed by an amount obtained by multiplying the rotational difference by a reduction ratio. At this time, when the actuator 108 and the input shaft 101 are synchronized with no rotational difference therebetween, the eccentricity r1 does not change.

Therefore, by rotating the pinion 110, the internal gear 107 meshing with the teeth of the pinion 110, that is, the outer circumferential disk 105 rotates relative to the inner circumferential disk 108. Accordingly, the distance (that is, the eccentricity r1 of the eccentric disk 104) between the center (input central axis O1) of the pinion 110 and the center (first supporting point O3) of the outer circumferential disk 105 is changed.

In this case, the rotation of the pinion 110 can make the center (input central axis O1) of the pinion 110 match the center (first supporting point O3) of the outer circumferential disk 105. By matching both of the centers, the eccentricity r1 of the eccentric disk 104 is set to be "zero".

In addition, the one-way clutch 120 includes the output member (clutch inner portion) 121 which rotates about an output central axis O2 deviated from the input central axis O1, the ring-shaped input member (clutch outer portion) 122 which oscillates about the output central axis O2 by receiving the power of the rotational direction from the outside, the plural rollers (locking members) 123 which are inserted between the input member 122 and the output member 121 so as to set the input member 122 and the output member 121 to be in the state of being locked or unlocked with each other, and the biasing members 126 which bias the rollers 123 toward the direction setting the members to be in the locked state. When the forward (for example, the direction indicated by the arrow RD1 of FIG. 4) rotating speed of the input member 122 exceeds the forward rotating speed of the output member 121, the one-way clutch 120 transmits the rotational power input to the input member 122, to the output member 121. As a result, the oscillating motion of the input member 122 can be converted to the rotational motion of the output member 121.

As illustrated in FIG. 3, the output member 121 of the one-way clutch 120 is configured as a member which is continuous integrally in the axis direction. The plural input members 122 are provided in the axial direction, and the same numbers of input members as those of the eccentric disks 104 and the connecting members 130 are arranged so as to oscillate in the axial direction independently of each other. The roller 123 is inserted between the input member 122 and the output member 121 for each of the input members 122.

An overhang portion 124 is provided at a position on each of the ring-shaped input members 122 in the axial direction. At the overhang portion 124, a second supporting point O4 is provided to be deviated from the output central axis O2. A pin 125 is arranged on the second supporting point O4 of each of the input members 122. A tip end portion 132 (second end portion) of the connecting member 130 is rotatably connected to the input member 122 by the pin 125.

The connecting member 130 has a ring portion 131 at a first end side. The inner circumference of a circular opening 133 of the ring portion 131 is rotatably fitted to the outer circumference of the eccentric disk 104 through a bearing 140. Therefore, as described above, the first end of the connecting member 130 is rotatably connected to the outer circumference of the eccentric disk 104, and the second end of the connecting member 130 is pivotally connected to the second supporting point O4 which is provided to the input member 122 of the one-way clutch 120. Accordingly, the four-link mechanism in which the four links of the input central axis O1, the first supporting point O3, the output central axis O2, and the second supporting point O4 are pivot points is configured. The rotational motion output from the input shaft 101 to the eccentric disk 104 is transmitted to the input member 122 of the one-way clutch 120 as the oscillating motion of the input member 122. The oscillating motion of the input member 122 is converted to the rotational motion of the output member 121.

At this time, the eccentricity r1 of the eccentric disk 104 can be changed by the actuator 180 operating the pinion 110 of a variable gear ratio mechanism 112, in which the variable gear ratio mechanism 112 is configured by the pinion 110, the inner circumferential disk 108 which has the second circular hole 109 housing the pinion 110, the outer circumferential disk 105 which has the first circular hole 106 rotatably housing the inner circumferential disk 108, the actuator 180, and the like. By changing the eccentricity r1, the oscillating angle θ2 of the input member 122 of the one-way clutch 120 can be changed. As a result, the ratio of the rotating speed of the output member 121 to the rotating speed of the input shaft 101 (gear ratio: ratio i) can be changed. That is, by adjusting the eccentricity r1 of the first supporting point O3 with respect to the input central axis O1, the oscillating angle θ2 of the oscillating motion transmitted from the eccentric disk 104 to the input member 122 of the one-way clutch 120 is changed. As a result, the gear ratio when the rotational power input to the input shaft 101 is transmitted to the output member 121 of the one-way clutch 120 as the rotational power through the eccentric disk 104 and the connecting member 130, can be changed.

In this embodiment, the output shaft of the engine ENG is integrally connected to the input shaft 101 of the infinitely and continuously variable transmission mechanism BD, and the rotor shaft of the first motor generator MG1 is connected to the input shaft 101 of the infinitely and continuously variable transmission mechanism BD through the gears 3 and 4. In addition, the one-way clutch 120 which is a component of the infinitely and continuously variable transmission mechanism BD also serves as the above-described one-way clutch OWC which is provided between the transmission TM and the rotated driving member 11.

FIGS. 5A to 6D are diagrams illustrating a transmission principle of the variable gear ratio mechanism 112 in the infinitely and continuously variable transmission mechanism BD. As illustrated in FIGS. 5A to 6D, by rotating the pinion 110 of the variable gear ratio mechanism 112 to rotate the outer circumferential disk 105 relative to the inner circumferential disk 108, the eccentricity r1 with respect to the input central axis O1 (the rotation center of the pinion 110) of the eccentric disk 104 can be adjusted.

Figure 6A:
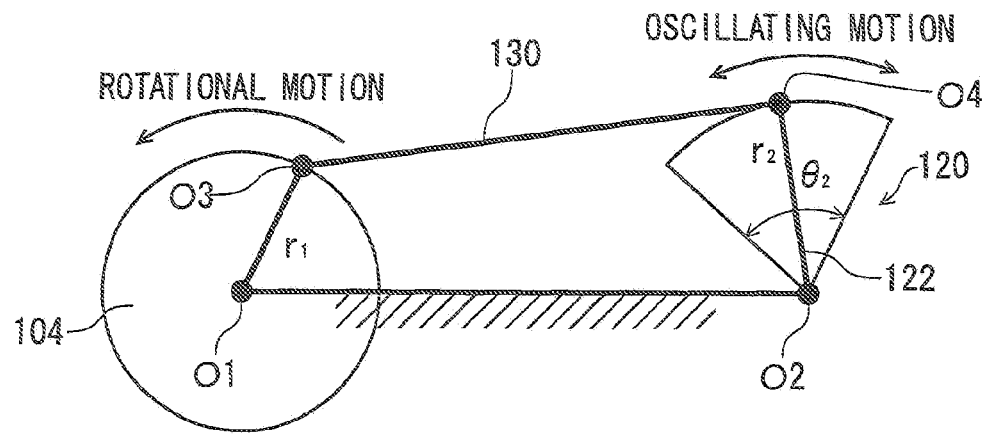
Figure 6B:
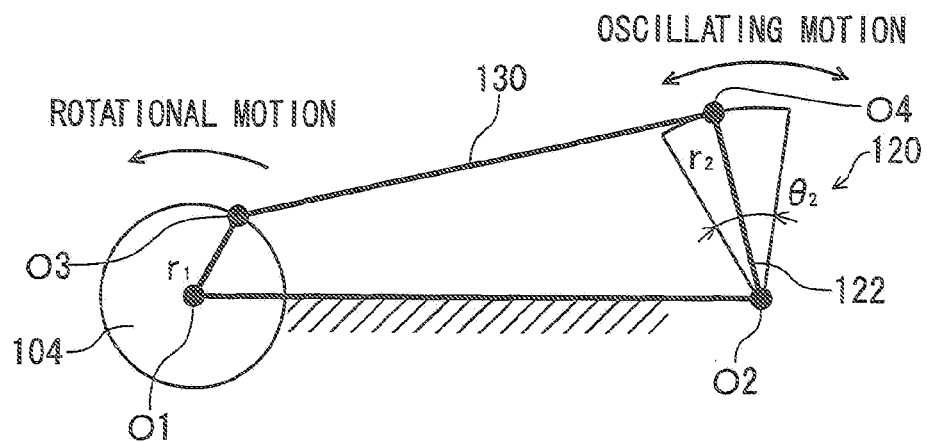
Figure 6C:
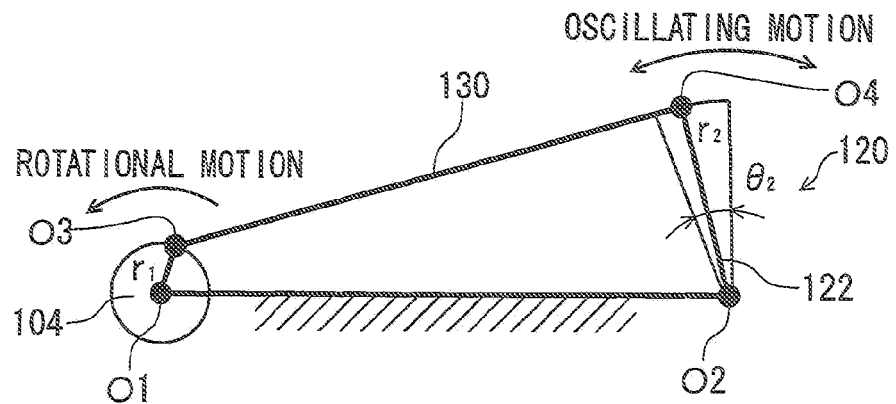

For example, as illustrated in FIGS. 5A and 6A, when the eccentricity r1 of the eccentric disk 104 is set to be "large", the oscillating angle θ2 of the input member 122 of the one-way clutch 120 can be set to be "large", thereby enabling a small gear ratio i to be realized. As illustrated in FIGS. 5B and 6B, when the eccentricity r1 of the eccentric disk 104 is set to be "intermediate", the oscillating angle θ2 of the input member 122 of the one-way clutch 120 can be set to be "intermediate", thereby enabling an intermediate gear ratio i to be realized. In addition, as illustrated in FIGS. 5C and 6C, when the eccentricity r1 of the eccentric disk 104 is set to be "small", the oscillating angle θ2 of the input member 122 of the one-way clutch 120 can be set to be "small", thereby enabling a large gear ratio i to be realized. As illustrated in FIG. 5D, when the eccentricity r1 of the eccentric disk 104 is set to be "zero", the oscillating angle θ2 of the input member 122 of the one-way clutch 120 can be set to be "zero", thereby enabling the gear ratio i to be "infinite (∞)".

Figure 7:
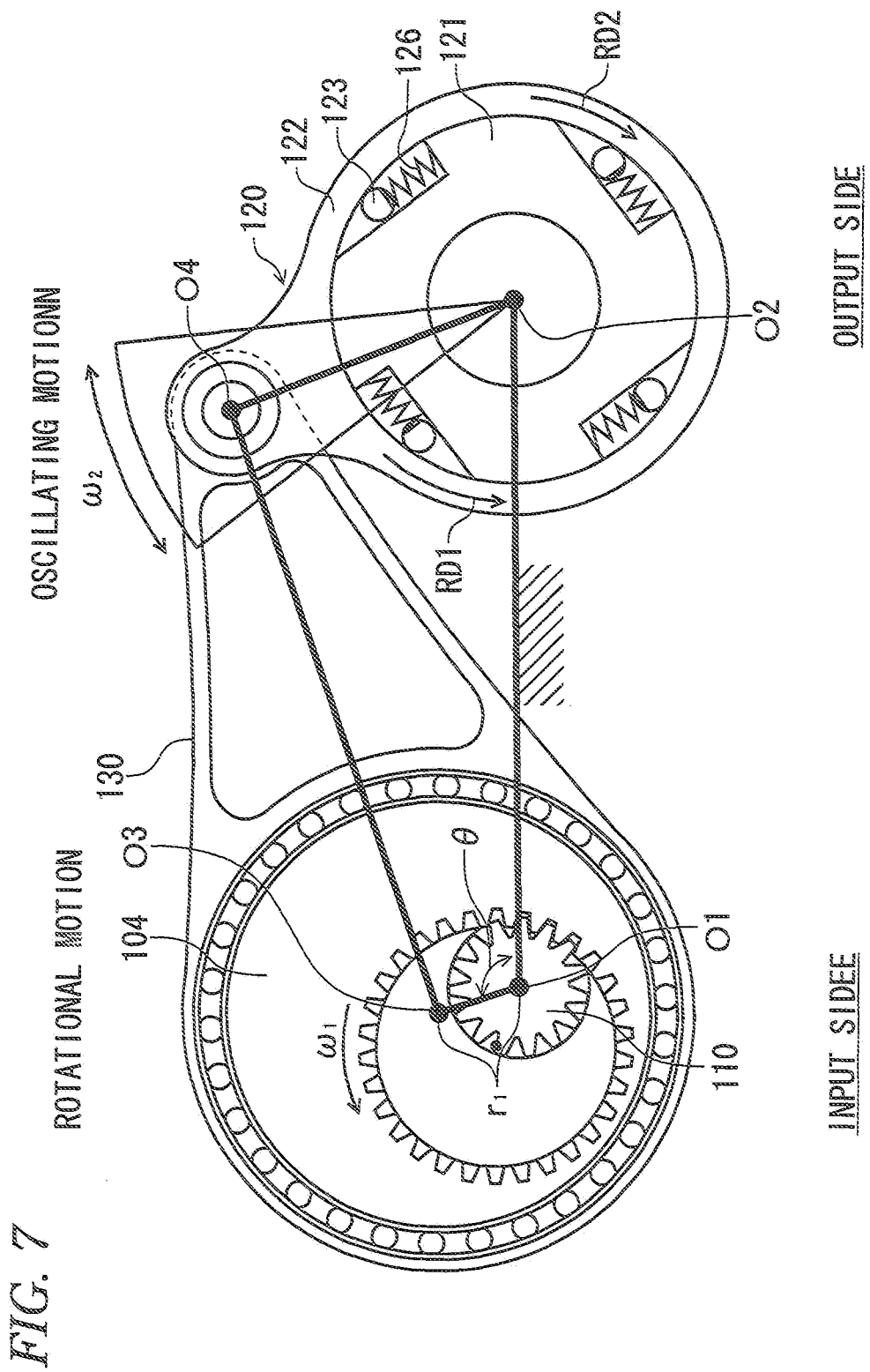
FIG. 7 is a diagram illustrating a driving force transmitting principle of the infinitely and continuously variable transmission mechanism configured as a four-link mechanism.
Figure 8:
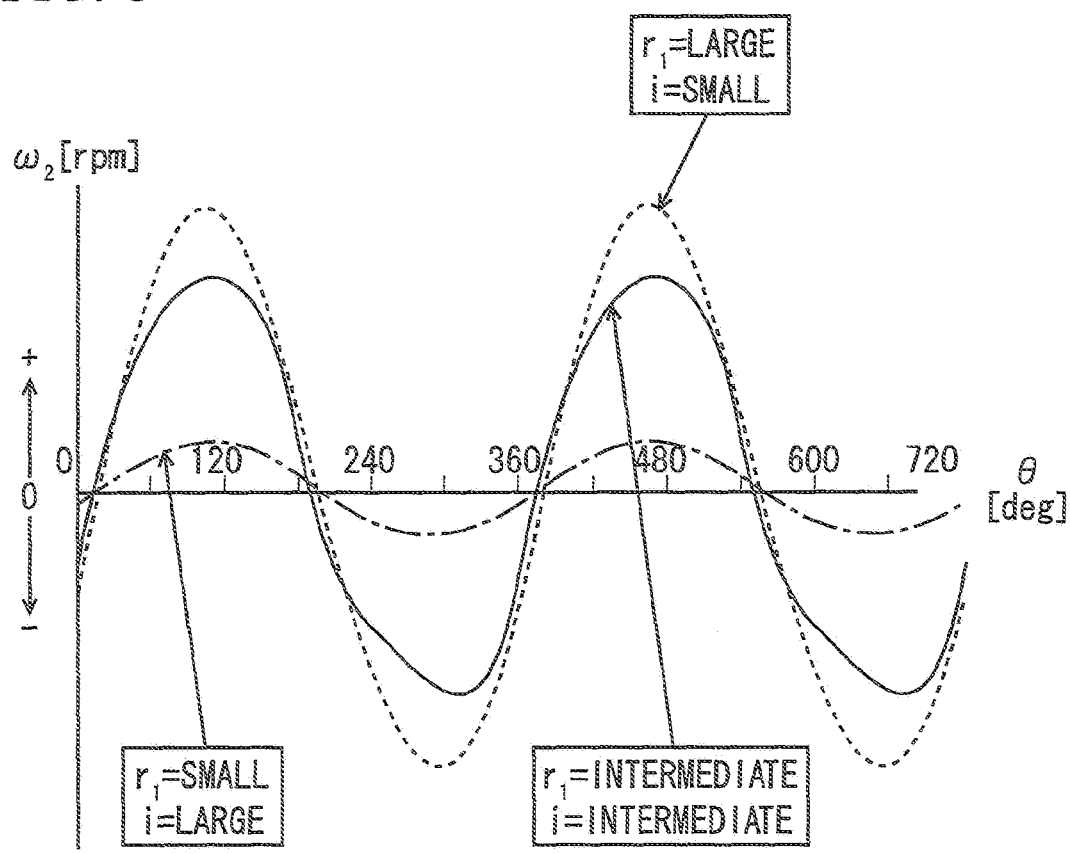
FIG. 8 is a diagram of the same transmission mechanism illustrating the relationship between a rotation angle θ of an input shaft and an angular velocity ω2 of the input member of the one-way clutch in a case where the eccentricity r1 (gear ratio i) of the eccentric disk constantly rotating along with the input shaft is changed between "large", "intermediate", and "small"
Figure 9:
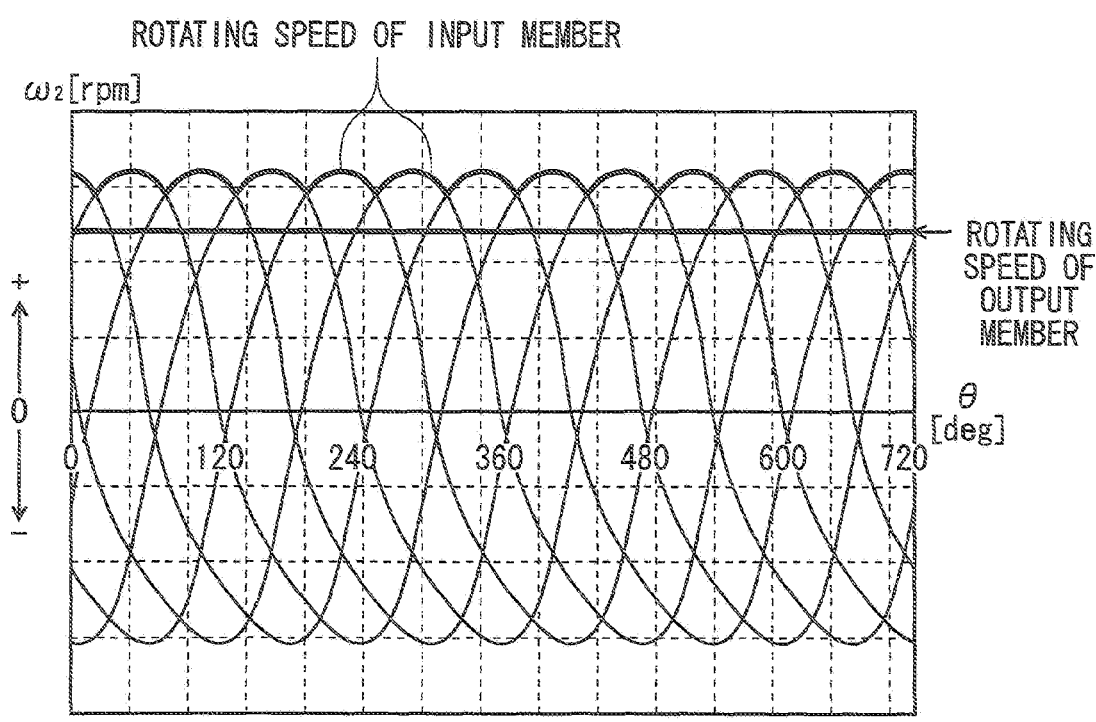
FIG. 9 is a diagram of the same transmission mechanism illustrating a principle of outputting the power when plural connecting members transmit the power from the input side (the input shaft and the eccentric disk) to the output side (an output member of the one-way clutch)

FIG. 7 is a diagram illustrating a driving force transmitting principle of the infinitely and continuously variable transmission mechanism BD configured as the four-link mechanism. FIG. 8 is a diagram of the same transmission mechanism BD illustrating the relationship between a rotation angle θ of the input shaft 101 and an angular velocity ω2 of the input member 122 of the one-way clutch 120 in a case where the eccentricity r1 (gear ratio i) of the eccentric disk 104 constantly rotating along with the input shaft 101 is changed between "large", "intermediate", and "small". FIG. 9 is a diagram of the same transmission mechanism BD illustrating a principle of outputting the power when the plural connecting members 130 transmit the power from the input side (the input shaft 101 and the eccentric disk 104) to the output side (the output member 121 of the one-way clutch 120).

As illustrated in FIG. 7, the input member 122 of the one-way clutch 120 (OWC) is oscillated by the power output from the eccentric disk 104 through the connecting member 130. When the input shaft 101 rotating the eccentric disk 104 rotates once, the input member 122 of the one-way clutch 120 reciprocates once while oscillating. As illustrated in FIG. 8, the oscillation period of the input member 122 of the one-way clutch 120 is constant all the time, irrespective of a value of the eccentricity r1 of the eccentric disk 104. The angular velocity ω2 of the input member 122 is determined by a rotational angular velocity ω1 of the eccentric disk 104 (the input shaft 101) and the eccentricity r1.

The first ends (ring portions 131) of the plural connecting members 130 connecting the input shaft 101 and the one-way clutch 120 are rotatably connected to the eccentric disks 104 which are provided around the input central axis O1 at regular intervals in the circumferential direction. Therefore, the oscillating motions of the input members 122 of the one-way clutch 120 which are caused by the rotational motion of the respective eccentric disks 104 are sequentially performed in a constant phase, as illustrated in FIG. 9.

At this time, the power (torque) is transmitted from the input member 122 of the one-way clutch 120 to the output member 121 only under the condition that the forward (the direction indicated by the arrow RD1 in FIG. 4) rotating speed of the input member 122 exceeds the forward rotating speed of the output member 121. That is, in the one-way clutch 120, only after the rotating speed of the input member 122 exceeds the rotating speed of the output member 121, the input member and the output member mesh (are locked) with each other through the roller 123 and the power of the input member 122 is transmitted to the output member 121 by the connecting member 130 to generate the driving force.

After the driving caused by one of the connecting members 130 is finished, the rotating speed of the input member 122 is reduced to lower than that of the output member 121 and the locking caused by the toilet 123 is released by the driving force of the other connecting members 130. As a result, the input member and the output member return to the free state (idle state). By performing the above-described operation sequentially by the number of times of connecting members 130, the oscillating motion is converted to the one-way rotational motion. Therefore, only the power of the input member 122 at the time of exceeding the rotating speed of the output member 121 is transmitted to the output member 121 sequentially and the rotational power which is almost evenly balanced is applied to the output member 121.

In addition, in the four-link mechanism type infinitely and continuously variable transmission mechanism BD, by changing the eccentricity r1 of the eccentric disk 104, the gear ratio (by what amount the rotated driving member 11 is rotated with respect to one rotation of the crank shaft which is the output shaft of the engine ENG) is determined. In this case, by setting the eccentricity r1 to be zero, the gear ratio i can be set to be infinite and the oscillating angle θ2 which is transmitted to the input member 122 can be set to be zero irrespective of the time the engine ENG is rotating.

<Overall Action of Vehicle Controller 50>

Next, the details of the control which is performed by the vehicle controller 50 on this drive system 1 will be described.

On the basis of the information input from the vehicle state detector 51, the vehicle controller 50 transmits control signals to, for example, the engine ENG, the first motor generator MG1, the second motor generator MG2, and the actuator 180 of the infinitely and continuously variable transmission mechanism BD configuring the transmission TM, and controls these elements to perform various controls of driving patterns and the like.

For example, the vehicle controller 50 has a function of selecting and performing one among an engine driving control mode in which the engine driving is controlled only by the driving force of the engine ENG, an EV driving control mode in which the EV driving is controlled by the driving force of the first motor generator MG1 or/and the second motor generator MG2, a parallel driving mode in which both of the driving force of the engine ENG and the driving force of the first motor generator MG1 or/and the second motor generator MG2 are used for driving, and regenerative operation control performed by the second motor generator MG2. In addition, the vehicle controller 50 has a function of giving an instruction to a system of supplying fuel to the engine ENG to perform fuel cut as necessary.

Figure 10:
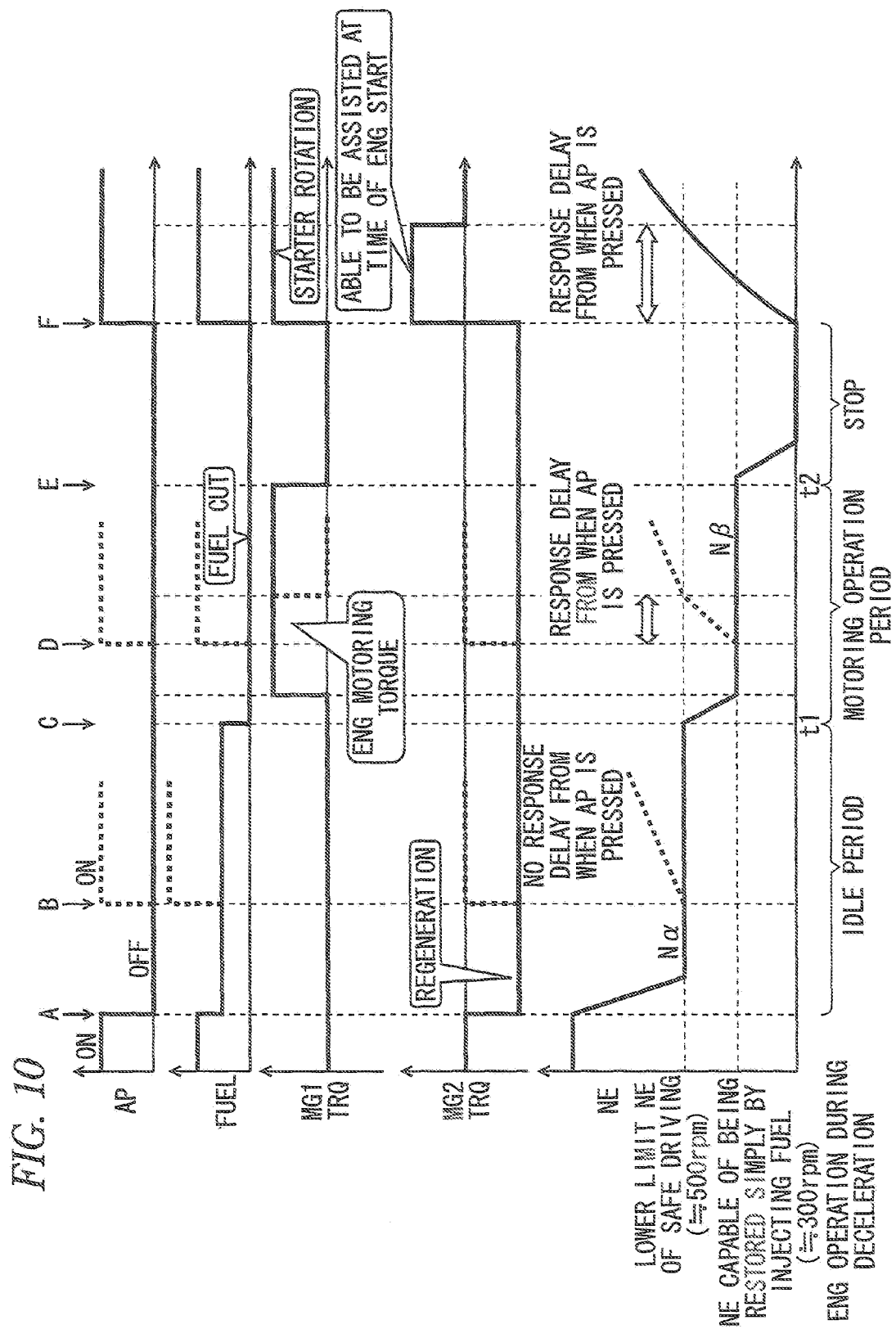
FIG. 10 is a time chart illustrating main operations of a drive system for a vehicle according to the embodiment.
Figure 11:
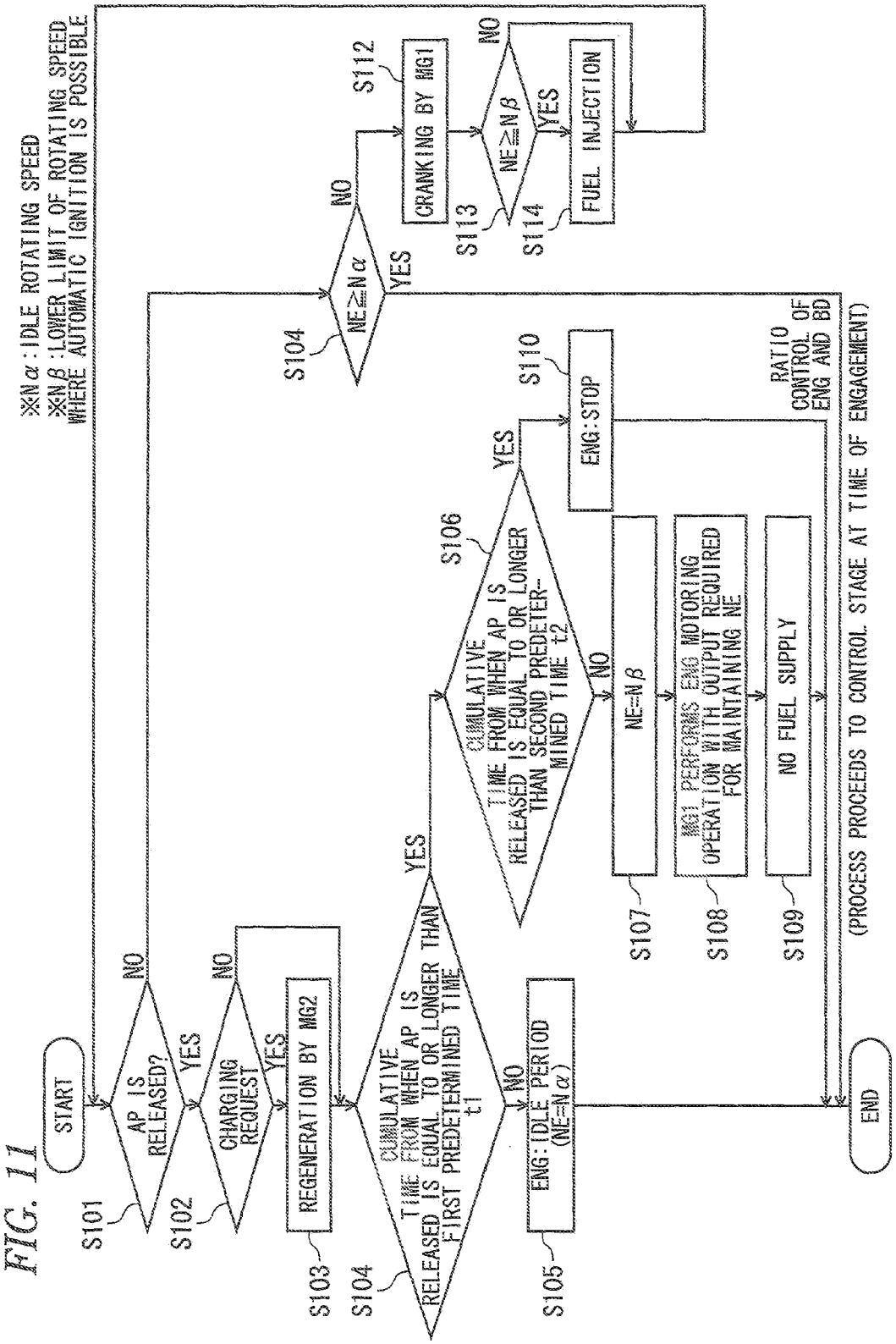
FIG. 11 is a flowchart illustrating control flows for implementing the operations of the time chart of FIG. 10.

Hereinafter, as an example of a characteristic method of using the first motor generator MG1 and the second motor generator MG2, the details of the control at the time of regenerative operation will be described. FIG. 10 is a time chart illustrating the details of the control including the operation at the time of regenerative operation, and FIG. 11 is a flowchart illustrating control flows for implementing the operations of the time chart.

The details of the control will be described with reference to the time chart of FIG. 10 and the flowchart of FIG. 11.

First, the accelerator pedal AP is pressed for engine driving, NO is determined in Step S101 and the process proceeds to Step S111. When the accelerator pedal AP is pressed for engine driving, the rotating speed NE of the engine is, of course, higher than an idle rotating speed Na. Therefore, YES is determined in Step S111, the routine of FIG. 11 ends (END), and the process proceeds to a stage of controlling the rotating speed of the engine ENG or controlling the ratio of the infinitely and continuously variable transmission mechanism BD.

When the accelerator pedal AP is released (the accelerator pedal AP is disengaged) from the pressed state (time A of the time chart of FIG. 10), YES is determined in Step S101 and whether there is a charging request or not is determined in Step S102. When there is a charging request, the regenerative generation is performed by the second motor generator MG2 in Step S103. That is, when the accelerator pedal AP is released from the pressed state, the rotating speed of the engine ENG is reduced and the rotating speed on the input side of the one-way clutch OWC is reduced to be lower than that on the output. side. As a result, the one-way clutch OWC is in the blocked state. At this time, the second motor generator MG2 can be operated as a power generator. Therefore, by performing the regenerative operation, the power on the drive wheel 2 side can be regenerated as electric energy and regenerative braking can work for the drive wheels 2 at the same time. All the electric energy generated by this regeneration is stored in the battery BATT and, as will be described below, a part or all of the energy can be used as electric power to be supplied directly to the first motor generator MG1.

When the regenerative operation is performed in Step S103, the process proceeds to Step S104 while the regenerative operation is continued. When there is no charging request, the process bypasses Step S103 and proceeds from Step S102 to Step S104. In Step S104, whether or not a cumulative time from when the accelerator pedal AP is released is equal to or longer than a first predetermined time t1 is determined. Until the predetermined time t1 elapses, the process proceeds to Step S105 and the engine ENG is in the idle period. That is, with a minimum amount of fuel supply (refer to FUEL in the time chart), the engine ENG is rotated with no load at the idle rotating speed Na (a lower limit NE of safe driving of approximately 500 rpm).

In the idle period, when the accelerator pedal AP is pressed down again to be engaged (time B of the time chart of FIG. 10), the rotating speed NE of the engine can be increased up to a required rotating speed with a good response (almost without a response delay from when the accelerator pedal AP is pressed). Therefore, the driving force of the engine ENG can be used as a travel driving force.

As described above, when the accelerator pedal AP is pressed, No is determined in Step S101 and the process proceeds to Step S111. In Step S111, the rotating speed NE of the engine is equal to higher than the idle rotating speed Na. Thus, this routine of control ends and the process proceeds to a control stage (stage of controlling the rotating speed of the engine or controlling the ratio of the infinitely and continuously variable transmission in order to transmit the driving force of the engine to the drive wheel side) at the time of engagement (when the power on the engine side is transmitted to the output member 121 of the one-way clutch OWC or the rotated driving member 11).

In addition, in a case where a cumulative time from when the accelerator pedal AP is released with the idle state maintained is equal to or longer than the first predetermined time t1 (time C of the time chart of FIG. 10), YES is determined in Step S104 and the process proceeds to Step S106. In this step S106, whether or not a cumulative time from when the accelerator pedal AP is released is equal to or longer than a second predetermined time t2 (t2>t1) is determined.

In the period until the second predetermined time t2 elapses from when the first predetermined time t1 elapses (period from t1 to t2), the process proceeds sequentially from Step S107 to Step S109 and the output shaft of the engine ENG is rotated by the driving force of the first motor generator MG1 (referred to as "motoring operation" and a period in which the motoring operation is performed is referred to as "a motoring operation period"). Simultaneously, in this period, the idling operation is not required and thus fuel cut is performed. A rotating speed Nβ of the output shaft of the engine ENG in this motoring operation period is set to be equal to or higher than a lower limit of the rotating speed where automatic ignition possible (starter rotating speed where the engine starts rotating when fuel is supplied again; a rotating speed of approximately 300 rpm lower than the idle rotating speed).

When the accelerator pedal AP is pressed down again to be engaged in the motoring operation period (time D of the time chart of FIG. 10), fuel is supplied again and thus the rotating speed NE of the engine can be increased up to a required rotating speed with a good response (with a small response delay from when the accelerator pedal AP is pressed) although the response is not comparable with that of the idle period. Therefore, the driving force of the engine ENG can be used as a travel driving force. At this time, the first motor generator MG1 continuously applies the driving force to the output shaft of the engine ENG until the rotating speed NE of the engine reaches the idle rotating speed Nα. When the rotating speed of the engine reaches the idle rotating speed, the first motor generator MG1 stops supplying torque. In addition, the driving force of the first motor generator MG1 may be continuously applied to the output shaft of the engine ENG until the rotating speed of the engine reaches a required rotating speed. By doing so, the response delay can be compensated for.

In addition, when a cumulative time from when the accelerator pedal AP is released is equal to or longer than the second predetermined time t2 (time E of the time chart of FIG. 10), YES is determined in Step 106, the process proceeds to Step S110, and the motoring operation of the output shaft of the engine ENG is stopped. That is, when the accelerator pedal is released for a long time, for example, when a vehicle drives in a long downhill, the motoring operation is stopped because continuing the motoring operation also consumes energy unnecessarily.

In this state, when the accelerator pedal AP is pressed down to be engaged (time F of the time chart of FIG. 10), NO is determined in Step S101 and the process proceeds to Step S111. In this step, since "the rotating speed NE of the engine<the idle rotating speed Nα", No is determined in Step S111 and the starter rotation is applied to the engine ENG by the first motor generator MG1 in Step S112. Until NE≥Nβ, the process proceeds in order of Step S101, Step S111, Step S112, and Step S113 and thus the starter rotation is continuously applied. When NE≥Nβ, YES is determined in Step S113, the process proceeds to Step S114, and fuel injection is performed. As a result, the engine ENG starts.

However, in this case, since the output shaft of the engine ENG starts from the state where the rotating speed is zero, a small response delay occurs. Here, until the rotating speed of the engine ENG reaches the idle rotating speed Nα, the driving force of the second motor generator MG2 may be applied to the rotated driving member 11 to assist the insufficient driving force at the time of engine start. By doing so, the response delay can be compensated for.

As described above, in the drive system according to this embodiment, when the second motor generator MG2 performs the regenerative operation, fuel supply to the engine ENG is cut and the first motor generator MG1 performs the motoring operation of the output shaft of the engine ENG at the same time. That is, when the accelerator pedal AP is released, the preliminary rotation (motoring operation) of the output shaft of the engine ENG is performed by the power of the first motor generator MG1 located upstream from the one-way clutch OWC while the second motor generator MG2 located downstream from the one-way clutch OWC regenerates the power output from the drive wheel 2 side. During that time, fuel cut is performed. By doing so, when the drive system is switched to the state (engine driving state) using the driving force of the engine ENG thereafter, the output rotating speed of the engine ENG can be increased up to a predetermined required rotating speed with, a good response simply by restarting fuel supply.

In addition, in the motoring operation period (when the first motor generator MG1 rotates the output shaft of the engine ENG), it is not necessary to perform idling operation with a minimum fuel supply and thereby unnecessary fuel consumption can be suppressed. That is, according to this drive system, fuel consumption and response at the time of restarting the engine ENG can be improved at the same time.

In addition, in a case where acceleration is selected by pressing down the accelerator pedal AP again during deceleration where the accelerator AP is released, when it is assumed that a time lag equal to or longer than a given time occurs until the engine ENG generates a required driving force, the response delay can be compensated for by continuously giving the driving force of the first motor generator MG1 to the output shaft of the engine ENG as it is.

In addition, the idle period is preferentially provided in the stage previous to the motoring operation period. That is, when the second motor generator MG2 performs the regenerative operation, the idling operation of the engine ENG is performed for the initial predetermined time t1 (in the previous stage). After the predetermined time t1, the first motor generator performs the motoring operation of the output shaft of the engine ENG while fuel cut is performed. Therefore, a case where the accelerator is pressed again in the idle period can exhibit a better response, as compared to a case where the accelerator is pressed during the motoring operation period.

In addition, the motoring operation is stopped after the motoring operation is performed for a predetermined time (t2-t1). As a result, unnecessary electric energy consumption can be suppressed to the minimum. That is, for example, when a vehicle drives in a long downhill, there is a case where a long time is taken until the accelerator pedal AP is pressed down again. In this case, when the motoring operation is continued during such a long time, unnecessary electric energy is consumed. To solve this problem, after a predetermined time, the motoring operation is stopped irrespective of the response. As a result, unnecessary energy consumption can be suppressed.

In addition, the gear ratio of the transmission mechanism TM during the motoring operation is changed according to the rotating speed of the rotated driving member 11 side such that the rotating speed of the input member 122 of the one-way clutch OWC (120) falls below the rotating speed of the output member 121. As a result, a shock caused by the motoring operation can be prevented from being transmitted to the drive wheel 2 side, which contributes to the improvement of a product performance.

In addition, when the electric power generated by the second motor generator MG2 performing the regenerative operation is directly supplied to the first motor generator MG1 as electric drive power, the energy efficiency can be improved.

In addition, the present invention is not limited to the above-described embodiment, and can be modified or improved appropriately. In addition, a material, shape, size, quantity, arrangement position, and the like of the respective components in the above-described embodiment are arbitrary and not limited as long as they can achieve the effects of the present invention.

Figure 12:
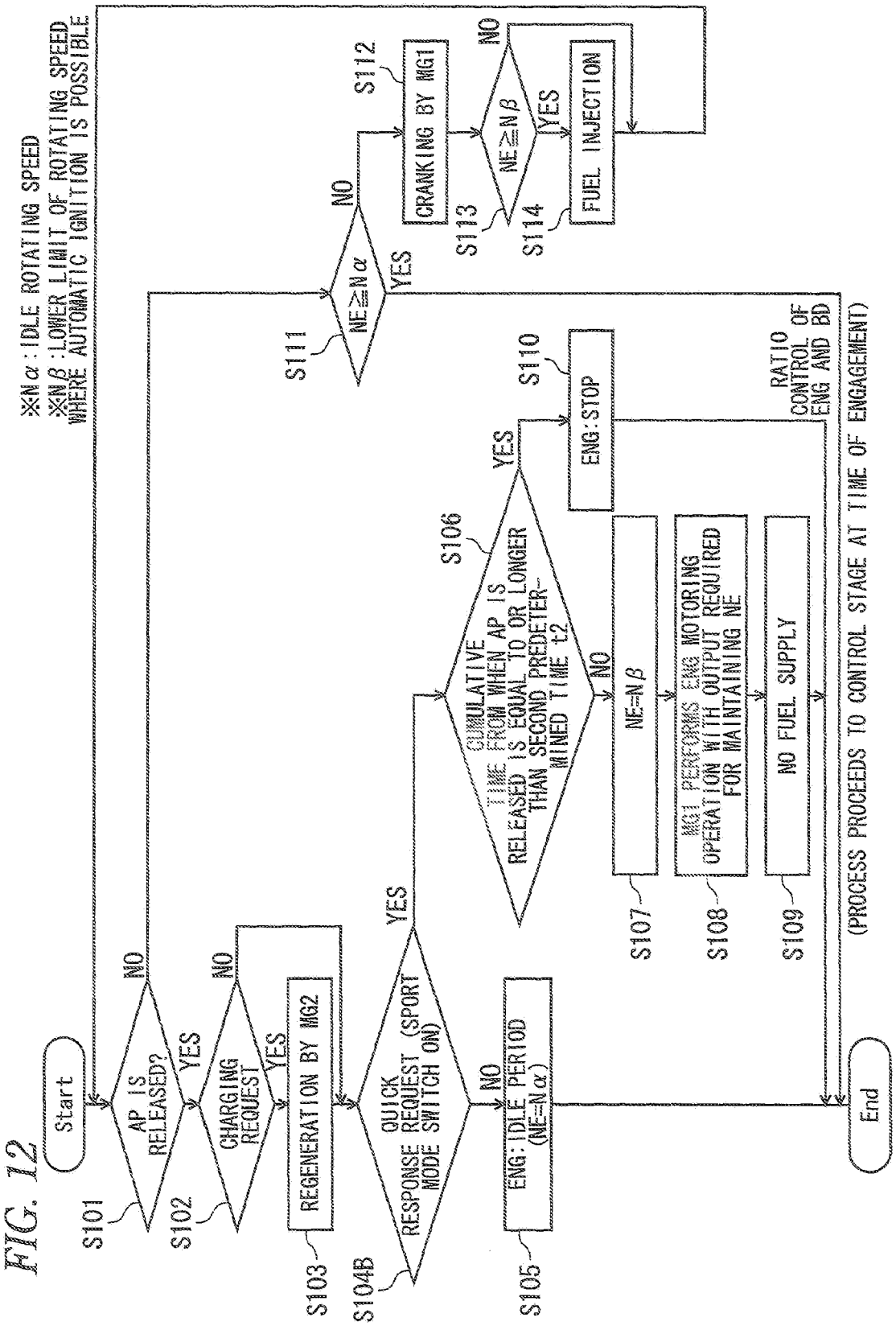
FIG. 12 is a flowchart illustrating another embodiment of the invention.
Figure 13:
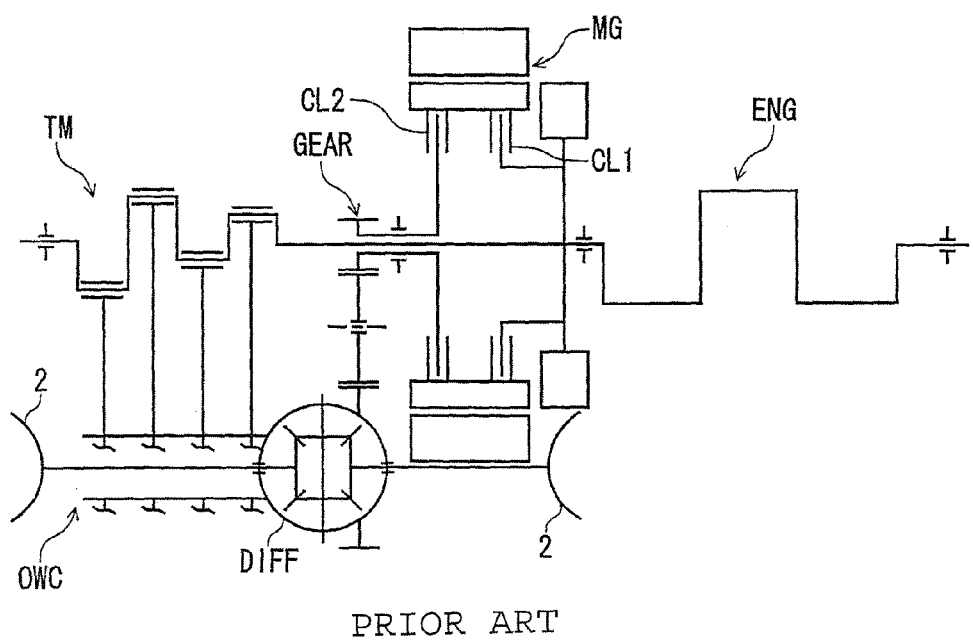
FIG. 13 is an outline diagram illustrating an example of a drive system for a vehicle in the related art.
Figure 14:
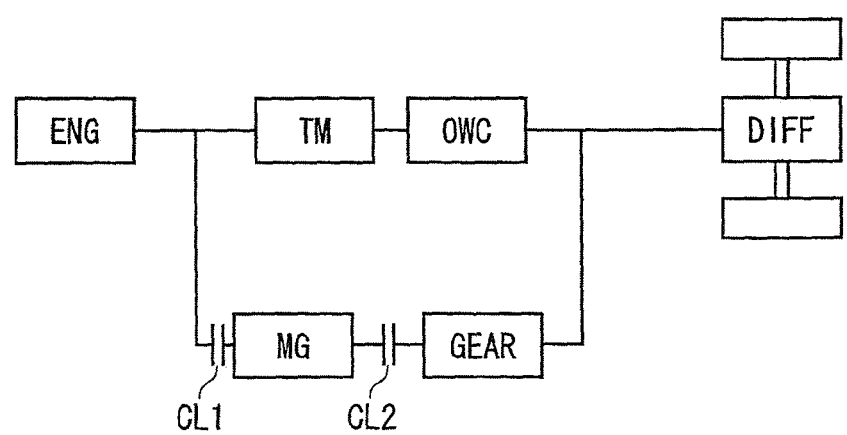
FIG. 14 is a block diagram schematically illustrating a configuration of FIG. 13.

For example, in the above-described embodiment, as illustrated in FIGS. 10 and 11, the case where whether the idle period should be provided or not is determined based on the cumulative time from when the accelerator pedal is released, has been described. However, the idle period may be provided only when a shift lever SL selects a sport mode (response-emphasized mode). That is, since the sport mode is the reference-emphasized mode, when this mode is selected, the idling operation is performed in preference to the motoring operation. Specifically, as illustrated in Step S104B of the flowchart of FIG. 12, whether quick response is required or not (whether a sport mode switch is switched on or not) is determined in this step S104B. When YES is determined, the idle period is provided. By doing this, a good response can be exhibited when the accelerator is pressed again during the idle period. In addition, when the flowchart of FIG. 12 is compared to the flowchart of FIG. 11, the difference is only Step S104B and the other steps are exactly the same.

In addition, in the above-described embodiment, the case where the eccentric disk 104, the connecting member 130, and the one-way clutch 120 are used to configure the transmission TM, has been described. However, other continuously variable transmission mechanisms may be used. When other continuously variable transmission mechanisms are used, the one-way clutch OWC may be provided on the downstream side from the continuously variable transmission mechanism.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:
1. A drive system for a vehicle, the system comprising:
an internal combustion engine that generates a rotational power with a fuel supply;
a transmission mechanism that changes a speed of the rotational power;

a one-way clutch comprising:
  an input member;
  an output member; and
  a locking member configured to allow the input member and the output member to be locked or unlocked with each other, the locking member being configured to transmit the rotational power provided to the input member to the output member when the input member and the output member are locked with each other,
wherein the input member and the output member are locked with each other when a forward rotating speed of the input member, which receives the rotational power output from the transmission mechanism, exceeds a forward rotating speed of the output member;
a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine;
an electric motor generator that is connected to the rotated driving member and configured to transmit the rotational power to the rotated driving member and configured to perform regenerative operation by receiving the rotational power output from the rotated driving member; and
a controller configured to cut off a fuel supply to the internal combustion engine and control the electric motor to rotate the output shaft of the internal combustion engine while the electric motor generator performs the regenerative operation,
wherein the controller idles the internal combustion engine for an initial period of time, and then cuts off the fuel supply to the internal combustion engine and controls the electric motor to rotate the output shaft of the internal combustion engine while the electric motor generator performs the regenerative operation.

2. The system of claim 1, wherein the controller is configured to supply electric power generated by the electric motor generator to the electric motor as electric drive power.

3. The system of claim 1, wherein the controller is configured to stop rotating the output shaft of the internal combustion engine after a certain time has passed.

4. A drive system for a vehicle, the system comprising:
an internal combustion engine that generates a rotational power with a fuel supply;
a transmission mechanism that changes a speed of the rotational power;
a one-way clutch comprising:
  an input member;
  an output member; and
  a locking member configured to allow the input member and the output member to be locked or unlocked with each other, the locking member being configured to transmit the rotational power provided to the input member to the output member when the input member and the output member are locked with each other,
wherein the input member and the output member are locked with each other when a forward rotating speed of the input member, which receives the rotational power output from the transmission mechanism, exceeds a forward rotating speed of the output member;
a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine;
an electric motor generator that is connected to the rotated driving member and configured to transmit the rotational power to the rotated driving member and configured to perform regenerative operation by receiving the rotational power output from the rotated driving member;
a controller configured to cut off a fuel supply to the internal combustion engine and control the electric motor to rotate the output shaft of the internal combustion engine while the electric motor generator performs the regenerative operation; and
a detector configured to detect a response-emphasized mode,
wherein the controller is configured to idle the internal combustion engine prior to rotating the output shaft of the internal combustion engine, after the detector detects the response-emphasized mode.

5. A drive system for a vehicle, the system comprising:
an internal combustion engine that generates a rotational power with a fuel supply;
a transmission mechanism that changes a speed of the rotational power;
a one-way clutch comprising:
  an input member;
  an output member; and
  a locking member configured to allow the input member and the output member to be locked or unlocked with each other, the locking member being configured to transmit the rotational power provided to the input member to the output member when the input member and the output member are locked with each other,
wherein the input member and the output member are locked with each other when a forward rotating speed of the input member, which receives the rotational power output from the transmission mechanism, exceeds a forward rotating speed of the output member;
a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine;
an electric motor generator that is connected to the rotated driving member and configured to transmit the rotational power to the rotated driving member and configured to perform regenerative operation by receiving the rotational power output from the rotated driving member; and
a controller configured to cut off a fuel supply to the internal combustion engine and control the electric motor to rotate the output shaft of the internal combustion engine while the electric motor generator performs the regenerative operation,
wherein the transmission mechanism is a continuously variable transmission mechanism, and
the controller is configured to change a gear ratio of the transmission mechanism in response to a rotating speed of the rotated driving member such that the rotating speed of the input member is smaller than the rotating speed of the output member.

6. A vehicle driving method for driving a vehicle comprising:

an internal combustion engine that generates a rotational power with a fuel supply;
a transmission mechanism that changes a speed of the rotational power;
a one-way clutch comprising:
   an input member;
   an output member; and
   a locking member configured to allow the input member and the output member to be locked or unlocked with each other, the locking member being configured to transmit the rotational power provided to the input member to the output member when the input member and the output member are locked with each other,
   wherein the input member and the output member are locked with each other when a forward rotating speed of the input member, which receives the rotational power output from the transmission mechanism, exceeds a forward rotating speed of the output member; a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine; and
an electric motor generator that is connected to the rotated driving member and configured to transmit the rotational power to the rotated driving member and configured to perform regenerative operation by receiving the rotational power output from the rotated driving member,
the method comprising:
while performing the regenerative operation,
idling the internal combustion engine for an initial period of time;
cutting off the fuel supply to the internal combustion engine; and
controlling the electric motor to rotate the output shaft of the internal combustion engine.

7. The method of claim 6, further comprising:
supplying electric power generated by the electric motor generator to the electric motor as electric drive power.

8. The method of claim 6, further comprising:
stopping rotating the output shaft of the internal combustion engine after a certain time has passed.

9. A vehicle driving method for driving a vehicle comprising:
an internal combustion engine that generates a rotational power with a fuel supply;
a transmission mechanism that changes a speed of the rotational power;
a one-way clutch comprising:
   an input member;
   an output member; and
   a locking member configured to allow the input member and the output member to be locked or unlocked with each other, the locking member being configured to transmit the rotational power provided to the input member to the output member when the input member and the output member are locked with each other,
   wherein the input member and the output member are locked with each other when a forward rotating speed of the input member, which receives the rotational power output from the transmission mechanism, exceeds a forward rotating speed of the output member; a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine; and
an electric motor generator that is connected to the rotated driving member and configured to transmit the rotational power to the rotated driving member and configured to perform regenerative operation by receiving the rotational power output from the rotated driving member,
the method comprising:
cutting off a fuel supply to the internal combustion engine and rotating the output shaft of the internal combustion engine while performing the regenerative operation;
detecting a response-emphasized mode; and
idling the internal combustion engine prior to rotating the output shaft of the internal combustion engine, after detecting the response-emphasized mode.

10. A vehicle driving method for driving a vehicle comprising:
an internal combustion engine that generates a rotational power with a fuel supply;
a transmission mechanism that changes a speed of the rotational power,
   wherein the transmission mechanism is a continuously variable transmission mechanism;
a one-way clutch comprising:
   an input member;
   an output member; and
   a locking member configured to allow the input member and the output member to be locked or unlocked with each other, the locking member being configured to transmit the rotational power provided to the input member to the output member when the input member and the output member are locked with each other,
   wherein the input member and the output member are locked with each other when a forward rotating speed of the input member, which receives the rotational power output from the transmission mechanism, exceeds a forward rotating speed of the output member; a rotated driving member that is connected to the output member of the one-way clutch and transmits the rotational power transmitted to the output member to a drive wheel;
an electric motor that is connected to an output shaft of the internal combustion engine so as to rotate the output shaft of the internal combustion engine; and
an electric motor generator that is connected to the rotated driving member and configured to transmit the rotational power to the rotated driving member and configured to perform regenerative operation by receiving the rotational power output from the rotated driving member,
the method comprising:
cutting off a fuel supply to the internal combustion engine and rotating the output shaft of the internal combustion engine while performing the regenerative operation; and,
changing a gear ratio of the transmission mechanism in response to a rotating speed of the rotated driving member such that the rotating speed of the input member is smaller than the rotating speed of the output member.

* * * * *